No. 701,995. Patented June 10, 1902.
J. A. BURGESS.
METHOD OF PURIFYING ACETYLENE GAS.
(Application filed Dec. 19, 1900.)
(No Model.)
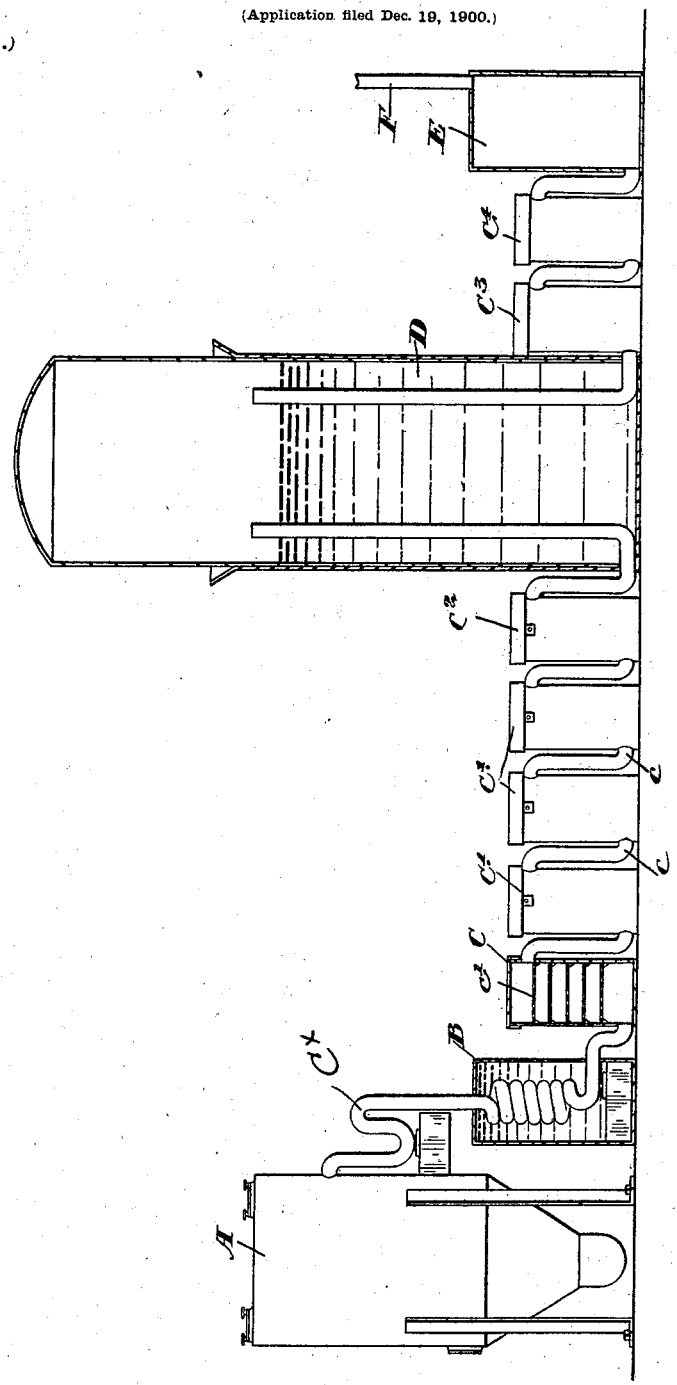

UNITED STATES PATENT OFFICE.

JOHN ARMSTRONG BURGESS, OF BRADFORD, CANADA.

METHOD OF PURIFYING ACETYLENE GAS.

SPECIFICATION forming part of Letters Patent No. 701,995, dated June 10, 1902.

Application filed December 19, 1900. Serial No. 40,411. (No specimens.)

*To all whom it may concern:*

Be it known that I, JOHN ARMSTRONG BURGESS, manufacturer, of the village of Bradford, in the county of Simcoe, in the Province of Ontario, Canada, have invented a certain new and useful Improved Process or Method of Treating and Purifying Acetylene Gas, of which the following is a specification.

My invention relates to an improved process or method of treating and purifying acetylene gas; and the object of the invention is to devise a method whereby the acetylene gas may be treated and purified in such a manner as to remove the matter which fouls and otherwise deleteriously affects the pipes and gas tips or burners; and it consists in the novel method which I shall now describe.

The drawing represents a diagrammatic view of the various vessels employed in my method.

A represents the acetylene-gas generator; B, the condenser; C, C', $C^2$, $C^3$, and $C^4$, the purifying-chambers; D, the gasometer, and E the final chamber from which the gas passes into the main F. All the chambers are connected together by suitable pipes $c$, so as to allow of the passage of the gas.

The apparatus above described is that used in my method; but the form and internal construction of same is not essential for the proper carrying out of the method. It will also be understood that the principal chambers may be varied as may be found best in the treatment of gas.

My method consists as follows: The acetylene gas generated in the generator A is conveyed by the pipes $C^x$ to the condenser B, which condenser is of a suitable construction designed to remove as much moisture in the gas as possible. The gas now passes through the pipes $c$ into a purifying-chamber C, arranged, preferably, with a series of trays $c'$, each containing charcoal treated with the metallic salt, preferably sulfate of iron. Other salts—such as sulfate of copper, sulfate of zinc, and other metals—may be employed as an equivalent, but not with such good results. The manner in which the charcoal is treated with the metallic salt is by simply immersing the charcoal in the solution of metallic salt and afterward drying the composition by evaporation, leaving the metal on the surface and in the pores of the charcoal. It must be pointed out that after the treatment of the charcoal the metallic salt permeates the pores thereof in such a manner as to leave such salt throughout the pores of the mass, or, in other words, a coating of the salt over the surface of the charcoal in the pores—in fact, over all the surfaces of the charcoal exposed. In the immersion the coating is to be as homogeneous as possible. The charcoal is generally obtained in large pieces, and after being immersed the pieces are attached to the negative electrode of an electric circuit. A plate of metal is attached to the positive electrode. Both are then immersed for some time in the cell containing a solution of the metal. Any soluble salt of metal will do. The time of immersion is regulated to the sizes of the piece of charcoal, so as to permit the solution to permeate into all the pores. When sufficient time has been allowed, the current of electricity is turned on and permitted to remain on for a longer or shorter period of time, according to the thickness of the metallic coating required. I preferably use a thin layer of metal, and consequently it is only necessary to keep the electric current on for a few minutes, this depending, of course, upon the strength of current used. The charcoal is then removed and thoroughly washed in pure water and dried, as hereinbefore described. This means of treating the charcoal with the metallic salt is of course not a step in the process. The effect of the gas passing over the charcoal treated with metallic salt is to remove the impurities, such as sulfureted and phosphoreted hydrogen, which cause the fouling of the jets and the pipes. I may here state that from my knowledge and experience in such matters it is by the acclusive properties of the charcoal that the impurities of the gas are brought into contact with the metal or metallic salt on the surface of the charcoal. The effect of course is to cause a complete chemical action between the impurities and the salt, thus eliminating the impurities which cause the fouling of the pipes and jet, which are mainly phosphoreted hydrogen, silicureted hydrogen, and ammonia, the term "silicureted hydrogen" referring to hydrogen combined with silica or silica compound. It will therefore be seen that this step of the process is an extremely important one. After the gas has passed through one or more chambers it passes into subsequent chambers, which I mark C', containing calcium carbid in a number of trays or on grates or otherwise suitably supported, so that the gas can pass freely around it. This calcium carbid has the effect of eliminating any further moisture in the gas and has a purifying action, inasmuch as the carbid is acted upon by the moisture in the gas and calcium oxid is formed, which acts on the sulfureted hydrogen to form a fixed compound with the sulfur and also seems to have a somewhat similar action on the phosphoreted hydrogen, and I believe also has a purifying action on the gas. The chambers C' C' may be duplicated, as desired, between the condenser and gasometer D. Before the gas reaches the gasometer it passes through another chamber $C^2$ or suitable pipes containing lava or a substance having a similar property in a more or less fine state of division. The chamber is preferably kept at a temperature slightly below the decomposition point of acetylene. The effect of the gas passing through the lava-chamber is to remove the vesicles of the oily hydrocarbons, which if this part of the process were omitted would naturally pass through to the burners, which being generally made of lava or similar material would there absorb these vesicles and cause the fouling of the burners. From the chamber $C^2$ the gas passes into the gasometer and then through the purifying-chambers $C^3$ and $C^4$, similarly arranged to the chambers C and C' and containing, respectively, charcoal treated with metallic salt and calcium carbid.

By the method I describe the gas when it enters the chamber E and the main is a pure dry gas.

The object of placing the chambers $C^3$ and $C^4$ between the gasometer and the main is to insure such a pure dry gas as to prevent the condensation from the gasometer passing into the cooler main or mains.

Although in this specification I describe my process as an entirety and as an entirety it produces the best results, it will be understood that various steps or combinations of steps may be employed, as set forth hereinafter, and good results obtained.

What I claim as my invention is—

1. The process of purifying acetylene gas, consisting in passing gas from the generator through charcoal, having the pores and surface thereof permeated with dry sulfate of iron previously deposited from a solution of the same whereby the impurities of the gas are brought by the occlusive property of the charcoal into intimate contact with the metal throughout the pores.

2. In the process of purifying acetylene gas, consisting in passing it over and through a porous and absorbent refractory material, such as lava, having affinity for the vesicles of the oily hydrocarbons.

3. The method of treating and purifying acetylene gas consisting in first subjecting the generated gas to the action of a condenser, then passing the gas so treated over charcoal treated with a solution of metallic salt, then passing the gas over and through calcium carbid and then through a chamber containing lava or refractory material such as that of which the tips are made as specified.

4. The method of treating and purifying acetylene gas consisting in first subjecting the generated gas to the action of a condenser then passing the gas so treated over charcoal treated with a solution of metallic salt, then passing the gas through calcium carbid and then passing the gas through a chamber containing lava or refractory material such as that of which the tips are made previous to its entrance to the gasometer, then finally subjecting the gas in the gasometer before its entrance to the main to the action of charcoal treated with a solution of metallic salt and to the action of carbid as specified.

5. The method of purifying acetylene gas, which consists in passing the gas after it has been purified and before it enters the mains into contact successively with charcoal treated with metallic salt, calcium carbid and refractory material such as lava as and for the purpose specified.

6. The method of purifying acetylene gas, which consists in passing the gas after it has been purified and before it enters the main into contact successively with charcoal treated with a solution of metallic salt and refractory material, such as lava, as specified.

JOHN ARMSTRONG BURGESS.

Witnesses:
B. BOYD,
R. SHIELDS.